(12) United States Patent
Dick et al.

(10) Patent No.: US 7,039,034 B2
(45) Date of Patent: May 2, 2006

(54) SYSTEM, METHOD AND COMPUTER PROGRAM PRODUCT FOR PROVIDING AN IP DATALINK MULTIPLEXER

(75) Inventors: Kevin Stewart Dick, Palo Alto, CA (US); Eric Kenneth Rescorla, Mountain View, CA (US)

(73) Assignee: Network Resonance, Inc., Palo Alto, CA (US)

( * ) Notice: Subject to any disclaimer, the term of this patent is extended or adjusted under 35 U.S.C. 154(b) by 725 days.

(21) Appl. No.: 09/861,116

(22) Filed: May 18, 2001

(65) Prior Publication Data

US 2002/0172174 A1  Nov. 21, 2002

(51) Int. Cl.
 *H04Q 7/24* (2006.01)
(52) U.S. Cl. .............. 370/338; 370/468; 370/437
(58) Field of Classification Search ........ 370/338, 370/351, 352, 353, 354, 389, 392, 395.21, 370/395.52, 400, 401, 466, 395.41, 437, 370/465, 468, 537, 538, 540, 328, 329, 336, 370/337, 341, 345, 347, 395.5, 473
See application file for complete search history.

(56) References Cited

U.S. PATENT DOCUMENTS 6,032,193 A * 2/2000 Sullivan .................. 709/239
6,075,796 A * 6/2000 Katseff et al. ............. 370/466
6,212,190 B1 * 4/2001 Mulligan ................... 370/400
6,490,292 B1 * 12/2002 Matsuzawa ................ 370/401
2003/0021275 A1 * 1/2003 Shabeer ..................... 370/393

OTHER PUBLICATIONS

CISCO, "Cisco 3200 Mobile Access Routers," 2 pgs, Copyright 1992-2002 Cisco Systems, Inc. URL: http:://www-.cisco.com/warp/public/cc/pd/rt/ps272/.
CISCO, "Cisco 3200 Mobile Access Routers Product Literature," 2 pgs, Copyright 1992-2002 Cisco Systems, Inc. URL: http:://www.cisco.com/warp/public/cc/pd/rt/ps272/prodlit/index.shtml.

* cited by examiner

*Primary Examiner*—Phirin Sam
(74) *Attorney, Agent, or Firm*—Paul, Hastings, Janofsky and Walker LLP

(57) ABSTRACT

A system, method and computer program product are disclosed for transmitting a datagram in a wireless multiplexing framework. A datagram destined to a destination in a network is received and a wireless connection is then selected from a set of wireless connections. The received datagram is then processed to associate an intermediary destination with the datagram. The datagram is subsequently transmitted to the associated intermediary destination via the selected wireless connection. From the associated intermediary destination, the datagram is then forwarded to the destination utilizing the network.

18 Claims, 6 Drawing Sheets

SYSTEM, METHOD AND COMPUTER PROGRAM PRODUCT FOR PROVIDING AN IP DATALINK MULTIPLEXER

FIELD OF THE INVENTION

This invention relates to networks, and more particularly, relates to multiplexing in wireless and wired networks.

BACKGROUND OF THE INVENTION

Although long distance wireless Internet connectivity is becoming increasingly popular, currently available long distance wireless access points typically suffer from extremely low bandwidth. A common form of wireless technology is based on cellular networks and offers data rates of approximately 9.6–14.4 kbps. Cellular Digital Packet Data (CDPD) layered on top of such a network can achieve 19.2 kbps but this usual requires upgrading of the cell sites and therefore is generally available only in a few areas (e.g., some metropolitan areas). The planned third generation (3G) wireless networks will offer 128 kbps. While adequate for many applications, this data rate is still relatively slow and requires the total replacement of current cellular infrastructure.

Another option is exemplified by Metricom's Ricochet network. Metricom has installed their own network of wireless access points in various metropolitan areas. So far, this approach has proved prohibitively expensive. Metricom advertises 128 kbps, but because the network bandwidth is shared, users often experience substantially worse performance.

The problem, then, is how to offer mobile users high speed Internet connectivity? Some features that one may need to consider in order to find a solution may include:

Offer speeds in excess of 64 kbps and preferably as high as 384 kbps
Be available essentially everywhere, not just in specific locations
Not require building substantial new points of presence
Be portable enough to attach to a laptop
Work with all common operating systems In addition, many non-mobile residential users suffer from similar problems. Some are too remote from broadband access points to receive service. So they must suffer with 56 kbps access, which is actually much lower because of restrictions on phone line voltage. Even some users with access to broadband services cannot get enough bandwidth from a single channel because of their distance from access points or the bandwidth of any given channel is so unreliable as to require redundant channels. Therefore, the solution should also support wired as well as wireless applications.

SUMMARY OF THE INVENTION

A system, method and computer program product are disclosed for transmitting a datagram in a multiplexing framework. A datagram destined to a destination in a network is received and a connection is then selected from a set of connections. The received datagram is then processed to associate an intermediary destination with the datagram. The datagram is subsequently transmitted to the associated intermediary destination via the selected connection. From the associated intermediary destination, the datagram is then forwarded to the destination utilizing the network.

In an embodiment of the present invention, the connections may be wireless connections. In an aspect of the present invention, the processing of the datagram may include encapsulating the datagram in an encapsulating datagram having information identifying the selected wireless connection and the associated intermediary destination. In such an aspect, the datagram may then be transmitted to the associated intermediary destination in the encapsulating datagram. Also, the datagram may be extracted from the encapsulating datagram at the intermediary destination prior to forwarding of the datagram to the destination. In another aspect, each of the connections may have an unique IP address associated therewith. In a further aspect, the associated intermediary destination may have an unique IP address associated therewith. In an additional aspect, selection of the connection from the set of connections may be based on: latency, bandwidth, load and/or cost. In such an aspect, latency, bandwidth, load and/or cost for each of the connections of the set of connection may be monitored in order to help make the selection. In yet another aspect, the datagram may be received from the source utilizing a local area network.

DETAILED DESCRIPTION

In the abstract, solving the above problem set forth in the background gives users a way to expand the size of the data "pipe" they can use. Because one, although not exclusive, focus is on wireless users, two insights help embodiments of present invention. First, one can multiplex data over multiple communications channels in order to get increased bandwidth. This technology has been available in the wired network under such names as BONDING and Multilink PPP. Second, one can also abstract away the differences between the technologies required to deal with each type of underlying channel. Such an abstraction enables multiplexed connectivity across different networks simply by plugging in new physical modules or to make an aggregation of dissimilar datalinks appear to be a single link.

Figure 1:
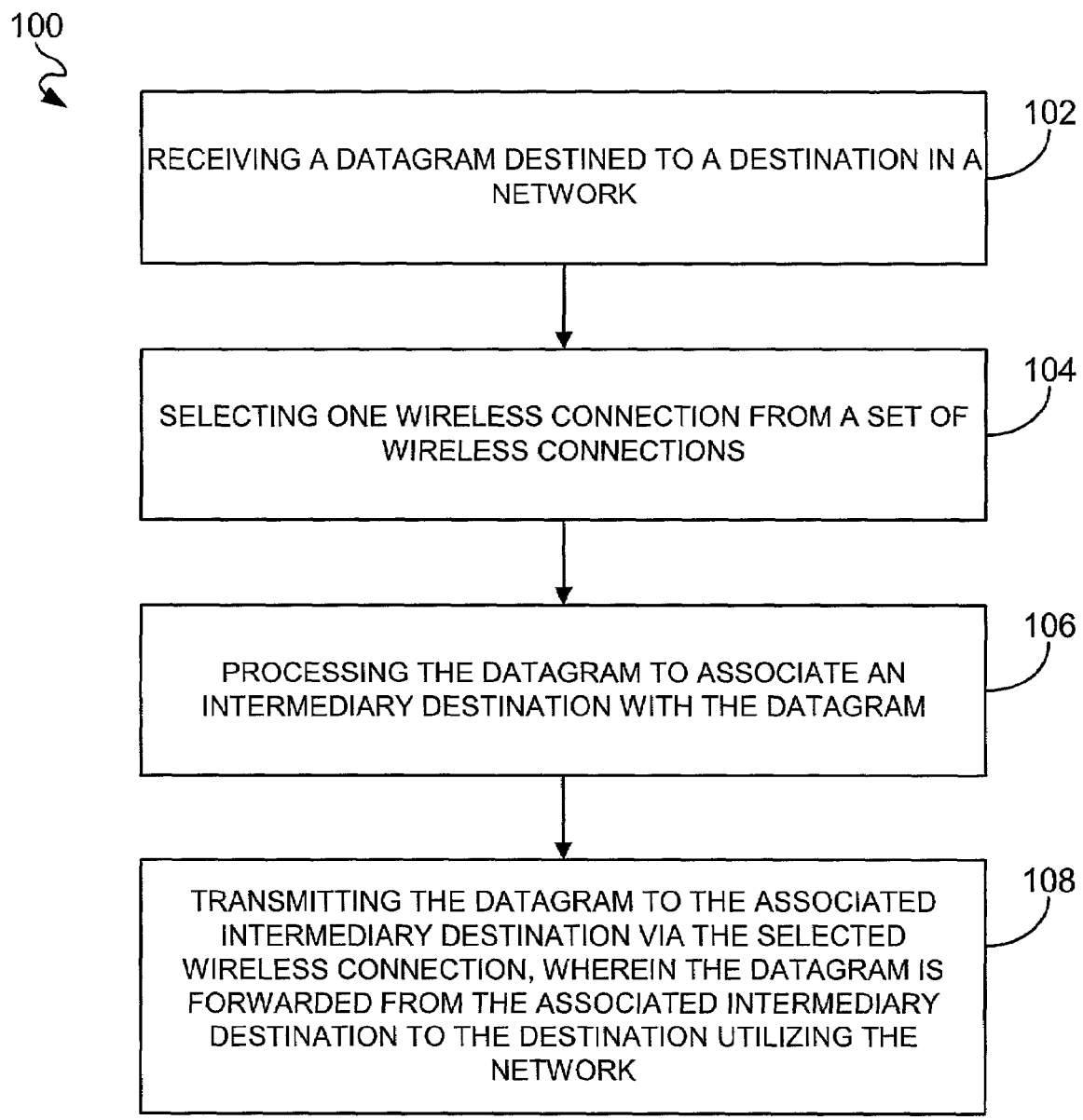
FIG. 1 is a flowchart of a process for transmitting a datagram in a multiplexing wireless framework in accordance with an embodiment of the present invention.

FIG. 1 is a flowchart of a process 100 for transmitting a datagram in a multiplexing wireless framework in accordance with an embodiment of the present invention. In operation 102, a datagram (e.g., a packet) is received at a unit from a source. The datagram is destined for a destination in a network such as a wide area network. From a set of wireless connections connected the unit, one wireless connection is selected in operation 104 for transmitting the datagram to an intermediary destination in communication with the unit via the wireless connections. The datagram is processed in the unit to associate the intermediary destination with the datagram in operation 106. The datagram is transmitted in operation 108 from the unit to the associated intermediary destination via the selected wireless connection. The datagram is then forwarded from the associated intermediary destination to the destination utilizing the wide area network.

In an aspect of the present invention, processing of the datagram in the unit may include encapsulating the datagram in an encapsulating datagram having information identifying the selected wireless connection as its source and the associated intermediary destination as its destination. In such an aspect, the datagram may be transmitted to the associated intermediary destination in the encapsulating datagram. Also, the datagram may be extracted from the encapsulating datagram at the associated intermediary destination prior to forwarding of the datagram to the destination. In another aspect, each of the wireless connection (including the selected wireless connection) may have an unique IP address associated therewith. In a further aspect, the associated intermediary destination may also have an unique IP address associated therewith. In an additional aspect, selection of the wireless connection from the set of wireless connects may be based on one or more of the following criteria: latency, bandwidth, load and cost. In such an aspect, latency, bandwidth, load and cost for each of the wireless connections of the set of wireless connection are monitored by both the unit and the associated intermediary destination. In one aspect, the unit may comprise a customer side unit, and the datagram may received from the source utilizing a local area network, and the associated intermediary destination may comprise a server side unit. In a converse aspect, the unit may comprise a server side unit, the associated intermediary destination may comprise a customer side unit, and the destination may be connected to the associated intermediary destination via a local area network.

Figure 2:
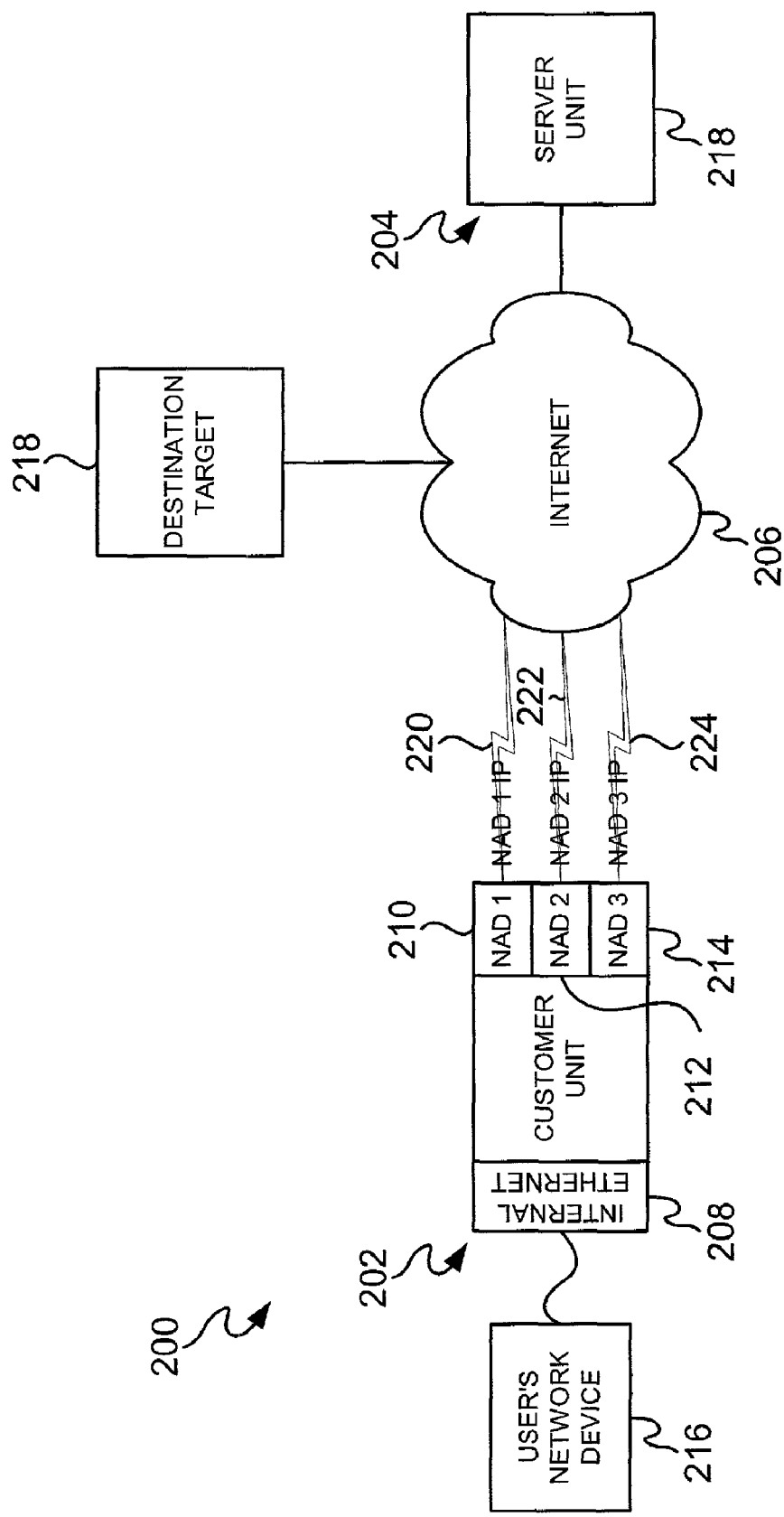
FIG. 2 is a schematic diagram of a wireless multiplexing framework in accordance with an embodiment of the present invention.

FIG. 2 is a schematic diagram of a wireless multiplexing framework 200 in accordance with an embodiment of the present invention. Like any remote access solution, the wireless multiplexing framework 200 has a customer side unit 202 and a service provider side unit 204 in communication via a wide area network 206 such as the Internet. Functionally, the units are relatively similar, however, in one preferred embodiment, the customer side unit 202 may be optimized for light weight and may also be battery powered while the server side unit 204 may preferably be optimized for high performance and the ability to handle multiple subscribers and therefore be powered via an electrical outlet in a structure (e.g., a wall outlet).

The basic customer unit (CU) 202 may comprise a box with two notional sides, a "local access side" and a "remote access side". The local side may include one or more Ethernet ports 208. The remote access side may include multiple slots for receiving network access devices (NAD's) 210, 212, 214. Some illustrative examples of such devices include: cellular modems of all kinds, non-cellular wireless modems, 802.11(b) or similar wireless LAN cards, wireline modems, and ordinary Ethernet cards (Note: all these devices may come in PC Card form factors, thus the customer unit may support all of these NAD's by providing a large number of PCMCIA slots).

In use, a user may plug a network device (e.g., computer, hub, router, etc.) 216 into the local access side 208 of the customer unit 202. The user may also plug appropriate access devices into the remote side of the customer unit. The customer unit may be capable of automatically detecting what sort of devices were installed and establish remote connections via those devices. The customer unit 202 may also be capable of bringing up and down various connections in response to the traffic load. In any event, as far as the user's equipment would be concerned, the customer unit presents a full-time Internet connection. Note: that in order to reduce size, the customer unit may include dedicated, non-modular NADs as part of the its hardware.

Given this definition of the customer unit 202 and its desired behavior, the server side unit ("server unit" or "SU") 204 may need to be more sophisticated. To avoid deploying POP's in arbitrary locations, the customer unit 202 should be able to connect to a local service provider and then transmit IP packets to the SU 204 end where these packets are reassembled into a single stream. In the other direction, the SU 204 arranges incoming traffic to a given customer node so that it is multiplexed across the various communications streams—to be reassembled at the CU 202. In one embodiment, the Internet address on the local access side may be unchanged by changing access mediums. In such an embodiment, the user's experience is the same as if the user was permanently connected via one access medium. However, it should be noted that this does not necessarily mean that the framework 200 cannot assign addresses via DHCP. It simply means that the framework may also be able to assign them statically.

Because the framework 200 multiplexes across disparate networks and maintains static IP's across lower-level network transitions, the framework may not be able to use multilink PPP or bonding. Rather, each network access device 210, 212, 214 makes a connection to a local POP to provide each device with its own IP address (a NAD IP as illustrated in FIG. 2) in the IP net block of its provider.

In use, we first consider a user-to-Internet scenario where a single packet is transmitted from the user 216 via the framework 200 to a destination target 218 connected to the Internet 206. In this scenario, the packet arrives at the internal interface 208 of the customer unit 202. The customer unit 202 determines the best NAD channel preferably based on some combination function of latency, bandwidth, load, and cost. The customer unit 202 then encapsulates the original packet in an IP packet destined for the external IP of the server unit 204.

Figure 3:
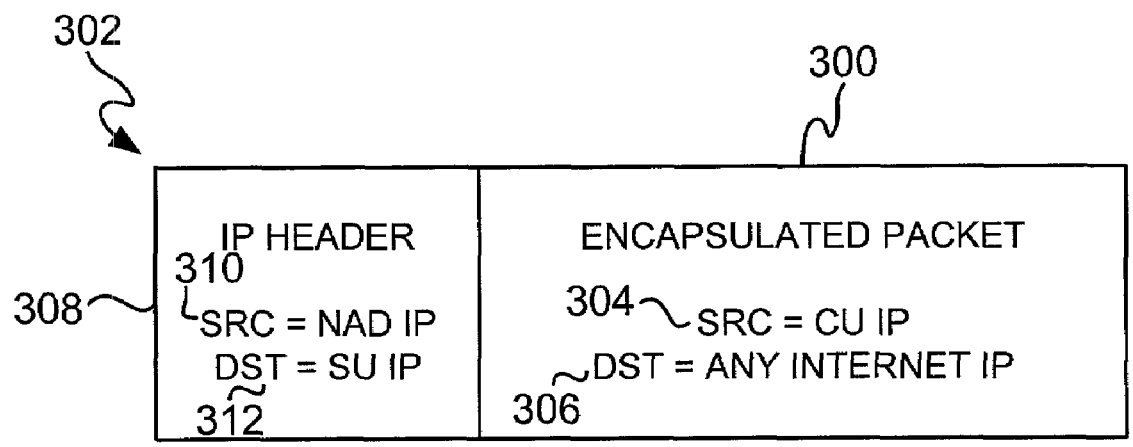
FIG. 3 is a schematic representation of an encapsulated packet transmitted from a customer unit to a target destination utilizing the wireless multiplexing framework in accordance with an embodiment of the present invention.

FIG. 3 is a schematic representation of an encapsulated packet transmitted from a customer unit to a target destination utilizing the wireless multiplexing framework 200 in accordance with an embodiment of the present invention. As illustrated in FIG. 3, the original packet (the encapsulated packet) 300 is encapsulated in an encapsulating packet 302. The encapsulated packet 300 has a source 304 indicating the customer unit's IP address and a destination 306 indicating the target destination's IP address while the encapsulating packet 302 has an IP header 308 containing information indicating the IP address of the selected NAD as the source 310 and the IP address of the server unit as the destination 312.

Continuing with the above scenario, the customer unit 202 then transmits this encapsulated packet on the chosen NAD channel. The Internet 206 routs this packet in the normal fashion to the server unit 204 (since the destination of the encapsulating packet 302 is the server unit 204). When the server unit 204 receives such a packet 302, the server unit 204 then strips off the outer capsule to uncover the original packet 300 and forwards it to the original target 218 over the Internet.

We now turn to an Internet-to-user scenario where a single packet is transmitted from an outside source (e.g., the destination 218) connected to the Internet 206 to the customer unit 202/user 216 via the framework 200. In this scenario, a single packet is to be transmitted from some machine on the Internet to the customer unit/user. The machine 218 simply knows the customer unit's IP address, which comes out of a netblock managed by the provider of the framework 200 service. Therefore, normal mechanisms ensure the routing of this packet through the server unit 204. When the server unit 204 receives the packet, the server unit 204 determines through normal routing mechanism the set of NAD channels which corresponds to the customer unit's IP. The server unit 204 then determines an optimal channel on which to transmit the packet (Note: that this choice may be decoupled from the channel traversed by any other packets to which this packet might be a response). Once the server unit 204 has determined the associated NAD channel, the server unit 204 encapsulates the received packet to target it at the associated NAD IP.

Figure 4:
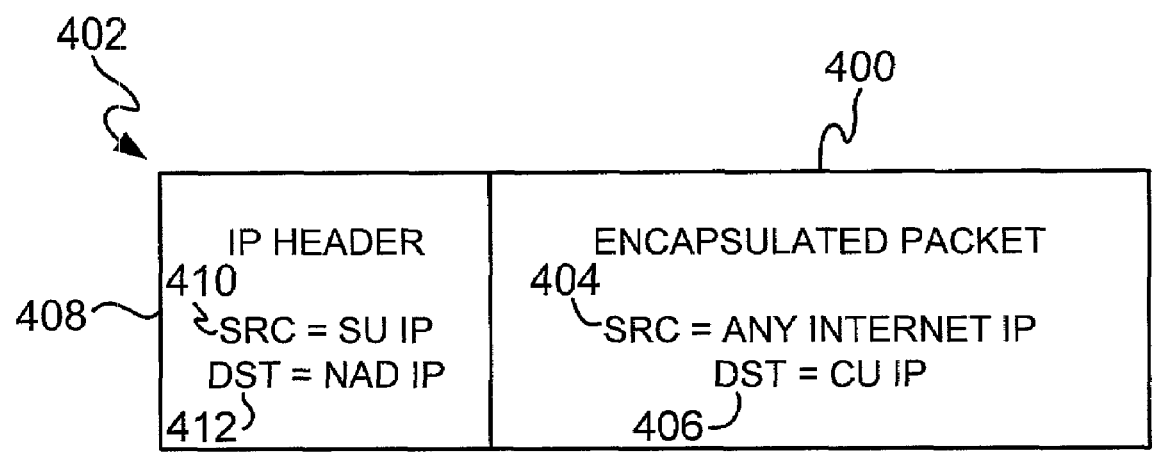
FIG. 4 is a schematic representation of an encapsulated packet transmitted from a server unit to a customer unit/user utilizing the wireless multiplexing framework in accordance with an embodiment of the present invention.

FIG. 4 is a schematic representation of an encapsulated packet transmitted from a server unit 204 to a customer unit/user utilizing the wireless multiplexing framework 200 in accordance with an embodiment of the present invention. As illustrated in FIG. 4, the original packet (the encapsulated packet) 400 which was received by the server unit 204 from the outside source 218 has been encapsulated in an encapsulating packet 402. The encapsulated packet 400 has a source 304 indicating the outside source's IP address and a destination 306 indicating the customer unit's IP address while the encapsulating packet 302 has an IP header 308 containing information indicating the IP address of the server unit as the source 310 and the IP address of the selected NAD as the destination 312.

Continuing with the Internet-to-user scenario, upon receipt of the encapsulated packet, the customer unit 202 strips off the outer capsule 402 to obtain the original packet 400 and forwards the packet 400 to the internal Ethernet Interface 208 where the packet can then be forwarded to the user's device 216. Note that although the customer unit may have a multiplicity of separate NAD's while the server unit may only need standard Ethernet interfaces because the NAD channel-IP translation happens at the POP. Note that the customer unit may use external Ethernet Interfaces, such as those connected via USB, rather than an internal one.

Because packets in the framework 200 traverse wireless links 220, 222, 224, there may be a strong desire for security. If the framework 200 needs to tunnel the data anyway, the framework can take advantage of Internet Protocol Security (IPSEC) tunneling. In such an embodiment, wrapping header (i.e., the header of the encapsulating packet) then becomes an IPSEC header using standard IPSEC tunneling techniques. Such a strategy means that no special work is needed to reassemble the packet stream at the server unit 204 side. The server unit 204 simply needs to be able to have multiple tunnels with the same remote IP address. Ordinary IPSEC routers should be able to provide this capability. If the user is willing to have faster upload than download, then such a router might in and of itself be sufficient. Typically, however, a user may wish to have symmetric bandwidth, or more likely, faster download than upload. In such instance, this may require that the server unit 204 have the capability to multiplex outgoing data to multiple NAD channels as set forth in embodiments of the framework 200 of the present invention. In general, when IPSEC routers have multiple routes to a single IP address, the IPSEC routers preferentially send data through one of them. This may not be useful in some embodiments of the framework.

In some embodiments of the present invention, the server unit 204 may constantly monitor traffic on each link and thereby estimate the amount of bandwidth available and the expected arrival time of a packet transmitted on each link. Because the performance of different links may be quite asymmetric, a fast but slightly congested link may still be a better choice than a slow but uncongested link. The adaptive nature of the routing generally distinguishes the server unit 204 from ordinary routers.

In accordance with an embodiment of the present invention, Layer Two Tunneling Protocol (L2TP) may also provide a facility for tunneling PPP, and hence IP traffic through the public Internet to remote side. Since L2TP is based on PPP, there is implied support for multilink PPP and hence bi-directional multiplexing. However, for some applications, L2TP may not be as good as solution for the following reasons First, L2TP runs over UDP or TCP. This may be unnecessary overhead. It's intended to allow tunneling through firewalls and the like but the framework 200 doesn't have that problem because in most embodiments, the server unit 204 should be designed to be open to the network. Second, L2TP security is often poor or nonexistent. It relies on the application security protocol over which L2TP runs. In IP networks, this protocol is typically IPSEC. In such a situation one might as well run IPSEC directly. Third, L2TP setup is often too slow for certain applications. With preferred embodiments of the framework 200, new NAD channels should be brought up essentially instantly—preferably as soon as the server unit 204 receives a packet from a given channel it knows it is up. L2TP requires at least 2 round trip times for negotiation.

On the other hand, L2TP may be used in two modes. In the first, a cooperating POP would simply forward the framework's 200 PPP frames. In the second mode, the framework 200 may simply transmit PPP frames over UDP packets. However, in embodiments where the framework 200 must work over non-cooperating POP's, the second mode may be the better (if not the only) possibility.

An advantage for utilizing L2TP may be that the framework could take advantage of existing L2TP implementation. Another advantage is that L2TP may provide call management capabilities that the framework may need (e.g., the ability to determine when tunnels are down). L2TP also provides automatic header compression (LZW compression may also be used in the framework 200). In any case, the framework may be made to run over L2TP rather than simply IPSEC.

From a hardware perspective, both the customer unit 202 and server unit 204 may be general PC's in accordance with an embodiment of the present invention. This permits the framework 200 to run a general purpose operating system such as NetBSD and thereby take advantage of the wide variety of free software available for these platforms. In one embodiment, Because of the relatively small executable size for the framework software, neither device may necessarily require the amount of secondary storage providing rotating media. Flash memory may provide enough space at an acceptable price point and much greater robustness.

The customer unit 202 is preferably compact, lightweight, and of low power usage. For laptop applications, the framework 200 may be deployed to either a PC/104-based computer or a custom PCB with most of the framework system on an application-specific integrated circuit (ASIC). These form factors result in a box of minimal size. As discussed above, such a device may also incorporate some NAD's in ASIC, allowing a further reduction in size (although perhaps at the cost of some system flexibility). A customer unit 202 intended for laptop use may also incorporate a substantial battery, thus enabling portable operation. Because non-Intel architecture microprocessors typically have the lowest power consumption and certain free operating systems run on a wide variety of such processors, the customer unit 202 may also use one of these alternatives.

In another embodiment, remote but non-portable access to the framework may be utilized where a box the size of a medium sized hub is sufficiently small for the customer unit 202. This box may be based on either a PC/104 motherboard or a Single Board Computer (SBC). Whereas the laptop version may have only one or two Ethernet ports for client access, the non-portable customer unit 202 may be designed to have many ports thereby precluding the need for the user to purchase a separate hub.

In one embodiment of the present invention, the server unit 204 may either be an ordinary PC motherboard or a single board computer in a 19" rack mount form factor. A low end version may provide one external and one internal Ethernet port while a higher end version may provide multiple ports. Moreover, server unit 204 functionality could be embedded in other network devices.

As described above, the framework's software may run on an ordinary operating system on the hardware. NetBSD may be a choice to utilize because of its wide portability, but other free operating systems such as Linux can result in a nearly identical solution. The framework preferably should be designed to run a custom NetBSD kernel with special modifications to the TCP/IP stack and additional management applications.

The standard TCP/IP stack serves fine for processing of incoming packets but for processing of outgoing packets, the TCP/IP stack may not be sufficient for some uses of this type of multiplexing. Embodiments of the framework may therefore need modified IPSEC tunnel code to auto-select the best tunnel based on our performance metrics. Such embodiment may also be able to maintain statistics about the performance of each tunnel—corresponding 1-for-1 to a NAD—to inform this routing behavior. The rest of the stack in such embodiment may be left largely unchanged.

As has become customary for small consumer network devices, management of the customer unit 202 may occur via a web interface. As has become customary for rackmount provider network devices, management of the server unit 204 may occur via a web interface. In embodiments of the present invention, the management functions of the framework may provide the capability to bring up and down various channels of the customer unit 202, control the IP behavior of the box customer unit 202 and server unit 204 (dynamic vs. static addresses, NAT, etc.), and manage billing and account information generated by the server unit 204. The server unit 204 may also be adapted to provide an SNMP interface to integrate with the network management system of the provider.

As for additional capabilities, the customer unit 202 may be adapted to offer a number of extra features such as transparent web caching, DNS, IPSEC support to end-sites (VPN), firewall, etc., many of which already have modules written for NetBSD.

Figure 5:
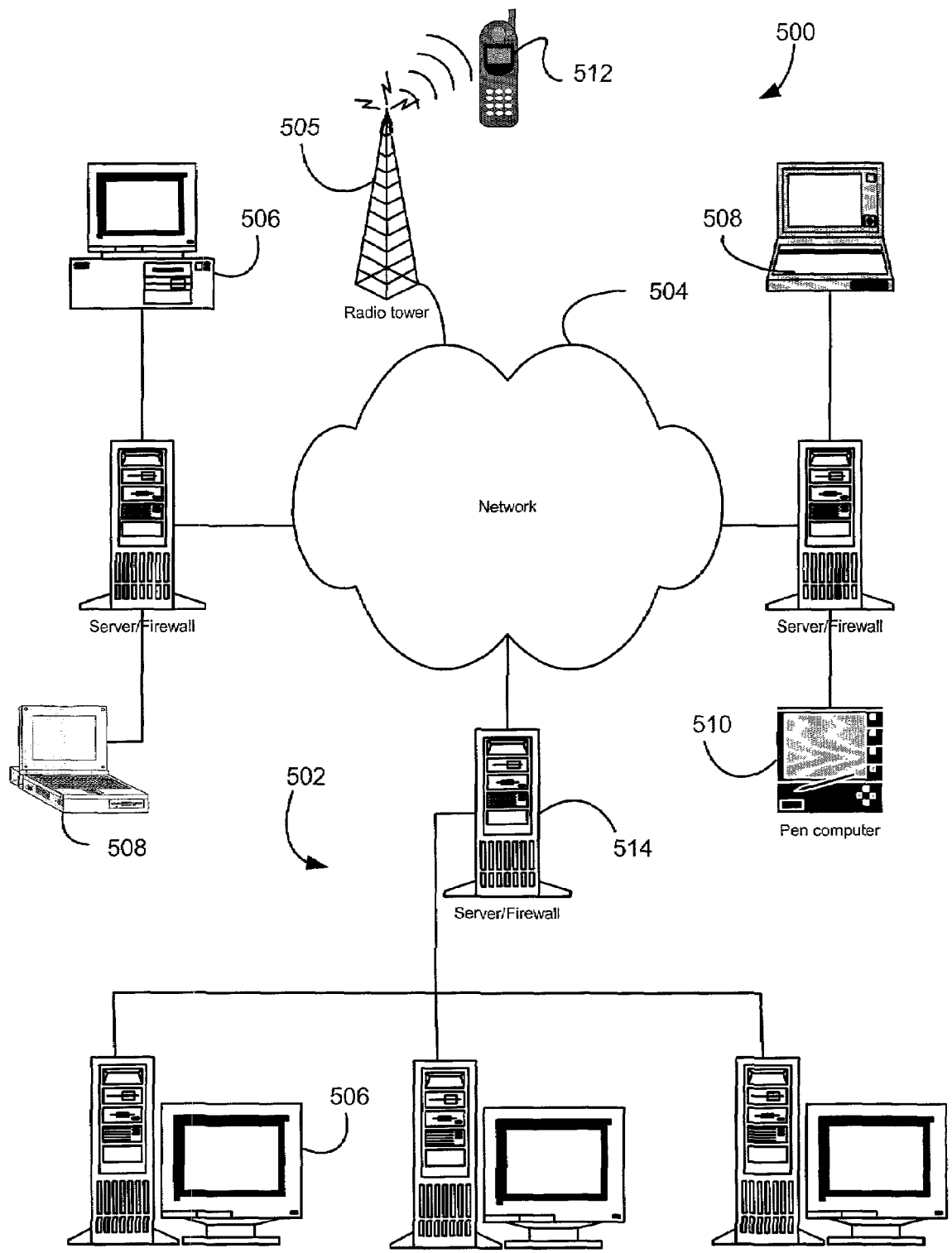
FIG. 5 is a schematic diagram of an illustrative system with a plurality of components in accordance with an embodiment of the present invention.

FIG. 5 illustrates an exemplary system 500 with a plurality of components 502 in accordance with one embodiment of the present invention. As shown, such components include a network 504 which take any form including, but not limited to a local area network, a wide area network such as the Internet, and a wireless network 505. Coupled to the network 504 is a plurality of computers which may take the form of desktop computers 506, lap-top computers 508, hand-held computers 510 (including wireless devices 512 such as wireless PDA's or mobile phones), or any other type of computing hardware/software. As an option, the various computers may be connected to the network 504 by way of a server 514 which may be equipped with a firewall for security purposes. It should be noted that any other type of hardware or software may be included in the system and be considered a component thereof.

Figure 6:
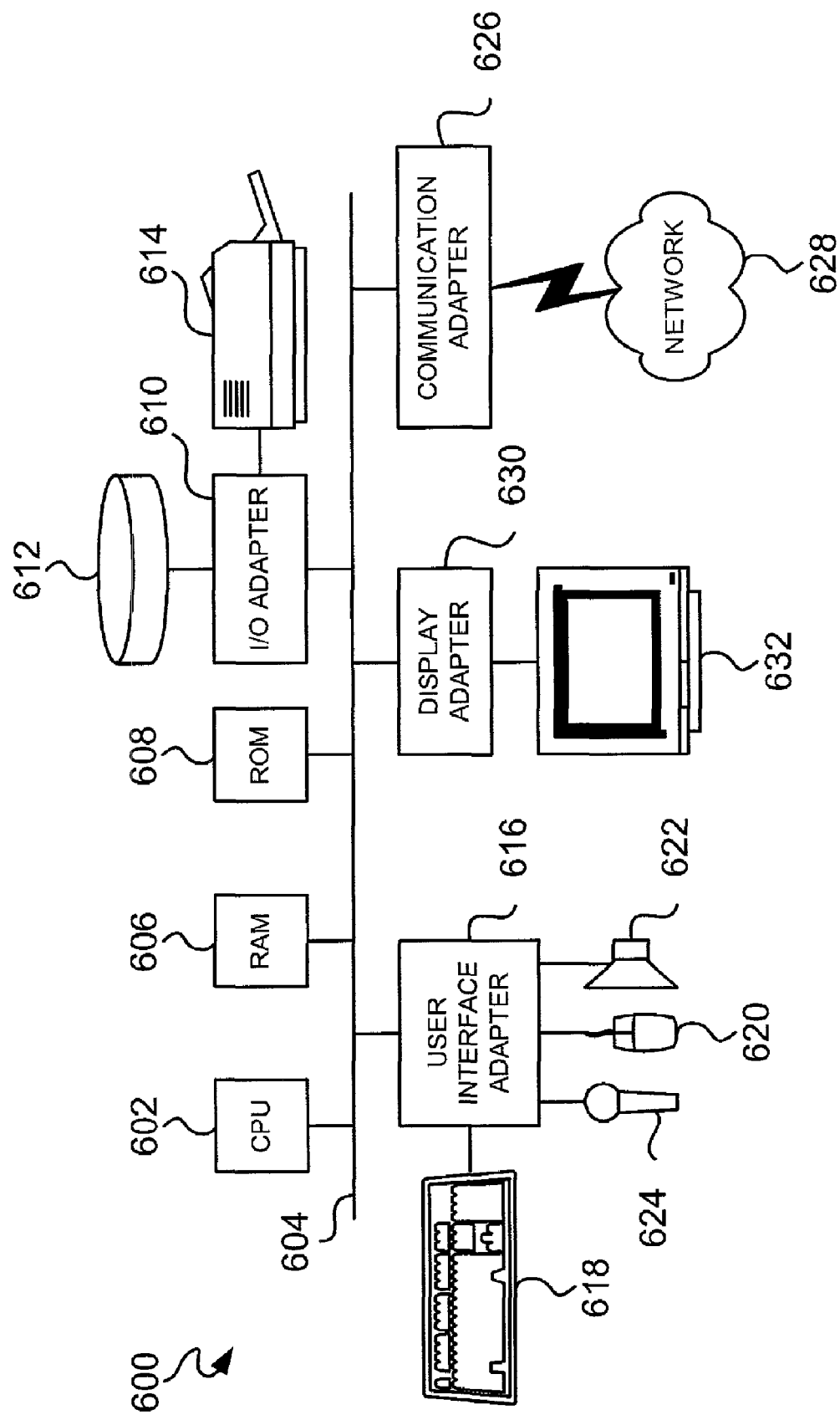
FIG. 6 is a schematic diagram of a representative hardware environment in accordance with an embodiment of the present invention.

A representative hardware environment associated with the various components of FIG. 5 is depicted in FIG. 6. In the present description, the various sub-components of each of the components may also be considered components of the system. For example, particular software modules executed on any component of the system may also be considered components of the system. FIG. 6 illustrates an illustrative hardware configuration of a workstation 600 having a central processing unit 602, such as a microprocessor, and a number of other units interconnected via a system bus 604.

The workstation shown in FIG. 6 includes a Random Access Memory (RAM) 606, Read Only Memory (ROM) 608, an I/O adapter 610 for connecting peripheral devices such as, for example, disk storage units 612 and printers 614 to the bus 604, a user interface adapter 616 for connecting various user interface devices such as, for example, a keyboard 618, a mouse 620, a speaker 622, a microphone 624, and/or other user interface devices such as a touch screen or a digital camera to the bus 604, a communication adapter 626 for connecting the workstation 600 to a communication network 628 (e.g., a data processing network) and a display adapter 630 for connecting the bus 604 to a display device 632.

An embodiment of the present invention may be written using traditional methodologies and programming languages, such as C, Pascal, BASIC or Fortran, or may be written using object oriented methodologies and object-oriented programming languages, such as Java, C++, C#, Python or Smalltalk. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine.

Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that can be called when those individual behaviors are desired in the program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the server. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. SGML documents are documents with generic semantics that are appropriate for representing information from a wide range of domains and are HTML compatible. HTML has been in use by the World-Wide Web global information initiative since 1990. HTML is an application of ISO Standard 8879; 1986 Information Processing Text and Office Systems; Standard Generalized Markup Language (SGML).

XML (Extensible Markup Language) is a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML. Such a standard way of describing data would enable a user to send an intelligent agent (a program) to each computer maker's Web site, gather data, and then make a valid comparison. XML can be used by any individual or group of individuals or companies that wants to share information in a consistent way.

XML, a formal recommendation from the World Wide Web Consortium (W3C), is similar to the language of today's Web pages, the Hypertext Markup Language (HTML). Both XML and HTML contain markup symbols to describe the contents of a page or file. HTML, however, describes the content of a Web page (mainly text and graphic images) only in terms of how it is to be displayed and interacted with. For example, the letter "p" placed within markup tags starts a new paragraph. XML describes the content in terms of what data is being described. For example, the word "phonenum" placed within markup tags could indicate that the data that followed was a phone number. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed.

XML is "extensible" because, unlike HTML, the markup symbols are unlimited and self-defining. XML is actually a simpler and easier-to-use subset of the Standard Generalized Markup Language (SGML), the standard for how to create a document structure. It is expected that HTML and XML will be used together in many Web applications. XML markup, for example, may appear within an HTML page.

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystems's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to Java is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for Java without undue experimentation to practice the invention.

Transmission Control Protocol/Internet Protocol (TCP/IP) is a basic communication language or protocol of the Internet. It can also be used as a communications protocol in the private networks called intranet and in extranet. When one is set up with direct access to the Internet, his or her computer is provided with a copy of the TCP/IP program just as every other computer that he or she may send messages to or get information from also has a copy of TCP/IP.

TCP/IP comprises a Transmission Control Protocol (TCP) layer and an Internet Protocol (IP) layer. TCP manages the assembling of series of packets from a message or file for transmission of packets over the internet from a source host to a destination host. IP handles the addressing of packets to provide for the delivery of each packet from the source host to the destination host. Host computers on a network, receive packets analyze the addressing of the packet If the host computer is not the destination the host attempts to route the packet by forwarding it to another host that is closer in some sense to the packet's destination. While some packets may be routed differently through a series of interim host computers than others, TCP and IP provides for the packets to be correctly reassembled at the ultimate destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously (note that the TCP layer itself is not stateless as far as any one message is concerned. Its connection remains in place until all packets in a message have been received.).

Many Internet users are familiar with the even higher layer application protocols that use TCP/IP to get to the Internet. These include the World Wide Web's Hypertext Transfer Protocol (HTTP), the File Transfer Protocol (FTP), Telnet which lets one logon to remote computers, and the Simple Mail Transfer Protocol (SMTP). These and other protocols are often packaged together with TCP/IP as a "suite."

Personal computer users usually get to the Internet through the Serial Line Internet Protocol (SLIP) or the Point-to-Point Protocol. These protocols encapsulate the IP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX) is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data.

Using a virtual private network involves encrypting data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPTP) and Microsoft has extended Windows NT_to support it. VPN software is typically installed as part of a company's firewall server.

Wireless refers to a communications, monitoring, or control system in which electromagnetic radiation spectrum or acoustic waves carry a signal through atmospheric space rather than along a wire. In most wireless systems, radio frequency (RF) or infrared transmission (IR) waves are used. Some monitoring devices, such as intrusion alarms, employ acoustic waves at frequencies above the range of human hearing.

Early experimenters in electromagnetic physics dreamed of building a so-called wireless telegraph. The first wireless telegraph transmitters went on the air in the early years of the 20th century. Later, as amplitude modulation (AM) made it possible to transmit voices and music via wireless, the medium came to be called radio. With the advent of television, fax, data communication, and the effective use of a larger portion of the electromagnetic spectrum, the original term has been brought to life again.

Common examples of wireless equipment in use today include the Global Positioning System, cellular telephone phones and pagers, cordless computer accessories (for example, the cordless mouse), home-entertainment-system control boxes, remote garage-door openers, two-way radios, and baby monitors. An increasing number of companies and organizations are using wireless LAN. Wireless transceivers are available for connection to portable and notebook computers, allowing Internet access in selected cities without the need to locate a telephone jack. Eventually, it will be possible to link any computer to the Internet via satellite, no matter where in the world the computer might be located.

Bluetooth is a computing and telecommunications industry specification that describes how mobile phones, computers, and personal digital assistants (PDA's) can easily interconnect with each other and with home and business phones and computers using a short-range wireless connection. Each device is equipped with a microchip transceiver that transmits and receives in a previously unused frequency band of 2.45 GHz that is available globally (with some variation of bandwidth in different countries). In addition to data, up to three voice channels are available. Each device has a unique 48-bit address from the IEEE 802 standard. Connections can be point-to-point or multipoint. The maximum range is 10 meters. Data can be presently be exchanged at a rate of 1 megabit per second (up to 2 Mbps in the second generation of the technology). A frequency hop scheme allows devices to communicate even in areas with a great deal of electromagnetic interference. Built-in encryption and verification is provided.

Encryption is the conversion of data into a form, called a ciphertext, that cannot be easily understood by unauthorized people. Decryption is the process of converting encrypted data back into its original form, so it can be understood.

The use of encryption/decryption is as old as the art of communication. In wartime, a cipher, often incorrectly called a "code," can be employed to keep the enemy from obtaining the contents of transmissions (technically, a code is a means of representing a signal without the intent of keeping it secret; examples are Morse code and ASCII). Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if User A sends User B a message, User A can find out User B's public key (but not User B's private key) from a central administrator and encrypt a message to User B using User B's public key When User B receives it, User B decrypts it with User B's private key. In addition to encrypting messages (which ensures privacy), User B can authenticate himself to User A (so User A knows that it is really User B who sent the message) by using User B's private key to encrypt a digital certificate. When User A receives it, User A can use User IB's public key to decrypt it.

Internet Protocol Security (IPSEC or IPsec) is a standard for security at the network or packet processing layer of network communication. Earlier security approaches have inserted security at the application layer of the communications model. IPSEC may be especially useful for implementing a virtual private network and for remote user access through dial-up connection to private networks. One advantage of IPSEC may be that security arrangements can be handled without requiring changes to individual user computers.

IPSEC provides two choices of security service: Authentication Header (AH), which essentially allows authentication of the sender of data, and Encapsulating Security Payload (ESP), which supports both authentication of the sender and encryption of data as well. The specific information associated with each of these services is inserted into the packet in a header that follows the IP packet header. Separate key protocols can be selected, such as the ISAKMP/Oakley protocol.

LZW compression is the compress of a file into a smaller file using a table-based lookup algorithm invented by Abraham Lempel, Jacob Ziv, and Terry Welch. Two commonly-used file formats in which LZV compression is used are the Graphics Interchange Format (GIF) image format served from Web sites and the Tag Image File Format (TIFF) image format. LZW compression may also be suitable for compressing text files.

A particular LZW compression algorithm takes each input sequence of binary digit of a given length (for example, 12 bits) and creates an entry in a table (sometimes called a "dictionary" or "codebook") for that particular bit pattern, comprising the pattern itself and a shorter code. As input is read, any pattern that has been read before results in the substitution of the shorter code, effectively compressing the total amount of input to something smaller. Unlike earlier approaches, known as LZ77 and LZ78, the LZW algorithm does include the look-up table of codes as part of the compressed file. The decoding program that uncompresses the file is able to build the table itself by using the algorithm as it processes the encoded input.

Layer Two Tunneling Protocol (L2TP) is an extension of the Point-to-Point Tunneling Protocol (PPTP) used by an Internet service provider (ISP) to enable the operation of a virtual private network over the Internet. L2TP merges the best features of two other tunneling protocols: PPTP from Microsoft and L2F from Cisco Systems. Two main components of L2TP are the L2TP Access Concentrator (LAC), which is the device that physically terminates a call and the L2TP Network Server (LNS), which is the device that terminates and possibly authenticates the PPP stream.

Point-to-Point Protocol (PPP) defines a means of encapsulation to transmit multiprotocol packets over layer two (L2) point-to-point links. Generally, a user connects to a network access server (NAS) through ISDN, ADSL, dialup POTS or other service and runs PPP over that connection. In this configuration, the L2 and PPP session endpoints are both on the same NAS.

L2TP uses packet-switched network connections to make it possible for the endpoints to be located on different machines. The user has an L2 connection to an access concentrator, which then tunnels individual PPP frames to the NAS, so that the packets can be processed separately from the location of the circuit termination. This means that the connection can terminate at a local circuit concentrator, eliminating possible long-distance charges, among other benefits. From the user's point of view, there may be no difference in the operation.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer subsystem embodying the method of the invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for transmitting a datagram in a multiplexing framework, comprising:
    a) receiving a datagram destened to a destination in a network;
    b) selecting one connection from a set of parallel established datalink connections to the network providing simultaneous network connections for a client, each of the connections in the set of connections having an unique IP address associated therewith, the selected connection being selected for the given datagram based on performance of each of the connections in the set of established connections;
    c) processing the datagram to associate an intermediary destination with the datagram; and
    d) transmitting the datagram to the associated intermediary destination via the selected connection, wherein the datagram is forwarded from the associated intermediary destination to the destination utilizing the network.

2. The method of claim 1, wherein the connections are wireless connections.

3. The method of claim 1, wherein the processing of the datagram includes encapsulating the datagram in an encapsulating datagram having information identifying the selected connection and the associated intermediary destination, and wherein the datagram is transmitted to the associated intermediary destination in the encapsulating datagram.

4. The method of claim 3, wherein the datagram is extracted from the encapsulating datagram at the intermediary destination prior to forwarding of the datagram to the destination.

5. The method of claim 1, wherein the associated intermediary destination has a unique IP address associated therewith.

6. The method of claim 1, wherein selection of the connection from the set of established connections for the given datagram is based on a comparison of at least one of: latency, bandwidth, load and cost of all of the established connections.

7. The method of claim 6, wherein the information transmitted to the location includes an identifier, and wherein at least a portion of the received content is based on the identifier.

8. The method of claim 1, wherein the datagram is received from the source utilizing a local area network.

9. The method of claim 1, wherein the selection of the connection is decoupled from the connection traversed by any other datagram.

10. A computer program product for transmitting a datagram in a multiplexing framework, comprising:
    a) computer code for receiving a datagram destened to a destination in a network;
    b) computer code for selecting one connection from a set of parallel established datalink connections to the network providing simultaneous network connections for a client, each of the connections in the set of connections having an unique IP address associated therewith, the selected connection being selected for the given datagram based on performance of each of the connections in the set of established connections;
    c) computer code for processing the datagram to associate an intermediary destination with the datagram; and
    d) computer code for transmitting the datagram to the associated intermediary destination via the selected connection, wherein the datagram is forwarded from the associated intermediary destination to the destination utilizing the network.

11. The computer program product of claim 10, wherein the connections are wireless connections.

12. The computer program product of claim 10, wherein the processing of the datagram includes encapsulating the datagram in an encapsulating datagram having information identifying the selected connection and the associated intermediary destination, and wherein the datagram is transmitted to the associated intermediary destination in the encapsulating datagram.

13. The computer program product of claim 12, wherein the datagram is extracted from the encapsulating datagram at the intermediary destination prior to forwarding of the datagram to the destination.

14. The computer program product of claim 10, wherein the associated intermediary destination has an unique IP address associated therewith.

15. The computer program product of claim 10, wherein selection of the connection from the set of established connections for the given datagram is based on a comparison of at least one of: latency, bandwidth, load and cost of all of the established connections.

16. The computer program product of claim 15, wherein at least one of: latency, bandwidth, load and cost for each of the connections of the set of connections is monitored.

17. The computer program product of claim 10, wherein the datagram is received from the source utilizing a local area network.

18. A system for transmitting a datagram in a multiplexing framework, comprising:
    a) a unit for receiving a datagram destened to a destination in a network;
    b) a set of parallel established wireless datalink connections connecting the unit to a network, each connection having an unique IP connection to an intermediary destination between the unit and the destination in the network;
    c) the unit having logic for processing the datagram to associate the intermediary destination with the datagram, selecting one connection for the given datagram from the set of connections, and transmitting the datagram to the intermediary destination via the selected connection, wherein selection of the connection for the given datagram from the set of connections is based on a comparison between each connection of at least one of: latency, bandwidth, load and cost of the established connections; and
    d) the intermediary destination having logic for warding the datagram to the destination utilizing the network.

* * * * *